April 5, 1927.

J. J. McLAUGHLIN 1,623,744

TURNSTILE

Filed Oct. 21, 1925      7 Sheets-Sheet 1

INVENTOR
John J. McLaughlin
BY
his ATTORNEYS

April 5, 1927.  1,623,744
J. J. McLAUGHLIN
TURNSTILE
Filed Oct. 21, 1925   7 Sheets-Sheet 2

INVENTOR
John J. McLaughlin
BY
ATTORNEYS

J. J. McLAUGHLIN 1,623,744

TURNSTILE

Filed Oct. 21, 1925 7 Sheets-Sheet 4

INVENTOR
John J. McLaughlin
BY
ATTORNEYS

April 5, 1927.

J. J. McLAUGHLIN

TURNSTILE

Filed Oct. 21, 1925

INVENTOR
John J. McLaughlin
BY
ATTORNEYS

April 5, 1927. 1,623,744

J. J. McLAUGHLIN

TURNSTILE

Filed Oct. 21, 1925 7 Sheets-Sheet 6

INVENTOR
John J. McLaughlin
BY
his ATTORNEYS

April 5, 1927.　　　　J. J. McLAUGHLIN　　　　1,623,744

TURNSTILE

Filed Oct. 21, 1925　　　7 Sheets-Sheet 7

INVENTOR
John J. McLaughlin
BY
his ATTORNEYS

Patented Apr. 5, 1927.

1,623,744

UNITED STATES PATENT OFFICE.

JOHN J. McLAUGHLIN, OF BROOKLYN, NEW YORK, ASSIGNOR TO HAROLD L. WARNER, OF BROOKLYN, NEW YORK.

TURNSTILE.

Application filed October 21, 1925. Serial No. 63,812.

My invention relates to a turnstile and more particularly to that type of such apparatus adapted to be used in the admission of patrons for a predetermined fee to railroad stations, trains, street cars, theatres, and all such and similar places where these devices may be employed. I am aware that heretofore devices of like nature have been employed for similar purposes. My present invention relates to a coin or token release turnstile which may be used both for entrance and exit purposes. I am also aware that heretofore such devices have been employed, but to the best of my knowledge and belief in such mechanisms as heretofore used, the operating mechanism has been controlled at least in part by magnetically operated devices, whereas in my present invention the mechanism is controlled entirely by mechanical devices. In carrying out the invention I also provide means for yieldingly mounting the head or frame in which the revoluble arms of the turnstile turn so as to prevent injury to the patrons in the event of a greater than a predetermined impetus being given to the revoluble portion of the frame when locked or when directed against the frame itself. In carrying out the invention I also provide means for making it necessary after the revoluble arms have been turned a predetermined distance to complete a partial revolution before the revoluble portion of the frame can be turned in the opposite direction. Still furthermore, the mechanism includes devices for preventing the revoluble arms and the frame in which they are carried from being turned in one operation more than a predetermined portion of a revolution before it is possible to operate the apparatus a second time. The apparatus is so constructed that it may be controlled by an operator instead of automatically controlled by a coin or token at the option of the operator himself. All of these features will be hereinafter more particularly described.

In carrying out the invention the turnstile made in accordance therewith includes a pedestal 20 which as is customary is provided with a base adapted to be supported on any suitable foundation. The pedestal is fitted with a top plate 21 which is secured in position thereon by means of stud bolts 20' or otherwise. In a centrally disposed and depending position the top plate 21 has a boss 22 which is centrally apertured and tapped for the purposes hereinafter described. Superimposed on the top plate 21 is a base 23 of a housing or frame which also includes side members 24, 25, end members 26 and 27, together with an upper plate 28 and a cover 29, all these parts being suitably connected to one another in any convenient manner.

Figure 1:
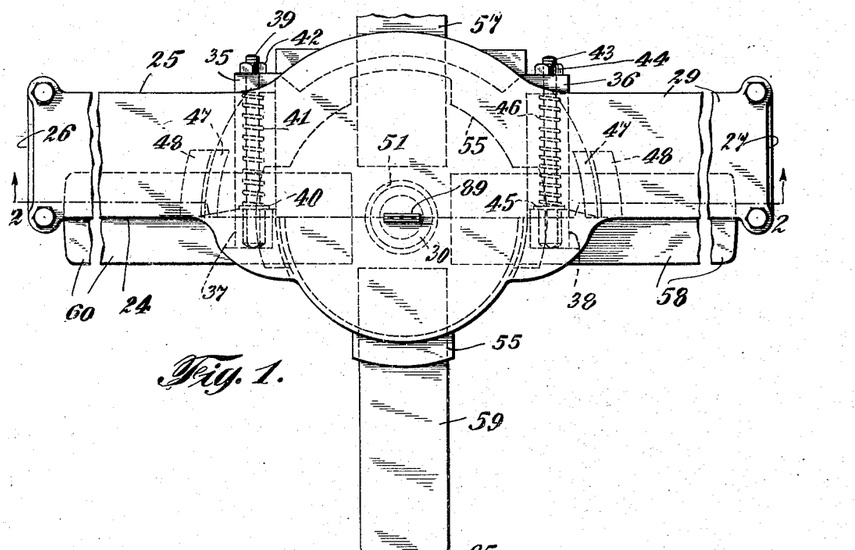
Figure 1 is a plan of a turnstile embodying my present invention.
Figure 9:
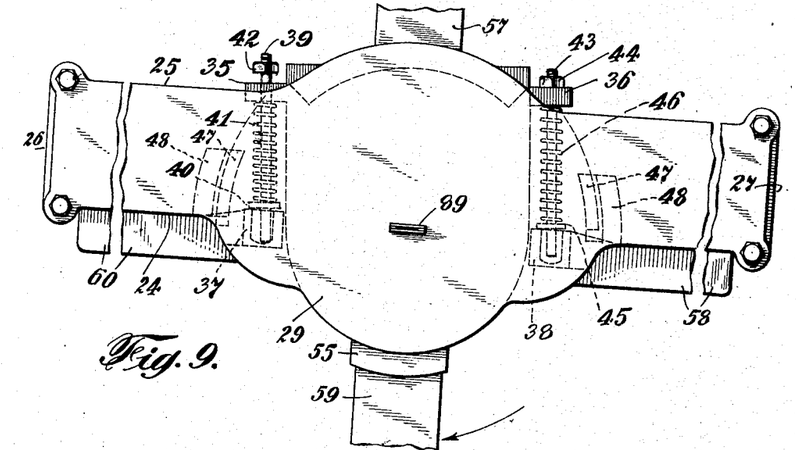
Fig. 9 is a plan showing the position of the frame as yieldingly movable on the pedestal.

Mounted in the tapped opening of the boss 22 is a tubular member 30 provided at one end with a screw threaded extremity 31 to engage in the tapped opening of the boss 22, this tubular member being secured in position by means of a washer 32 and a nut 33 or otherwise. In the upper face of the top plate 21 there is a recessed portion adapted to receive a centrally disposed flange 34 on the base 23 which is provided with a centrally disposed opening through which the tubular member 30 passes so that the base 23 and consequently the housing are adapted to turn a limited extent as hereinafter described upon the top plate 21. To provide for this limited yielding movement of the housing the pedestal is provided with bosses 35, 36 and the frame in similar but opposite positions with bosses 37 and 38. The bosses 35 and 37 are on one side of the central line of the housing and are fitted with a screw bolt 39 having a collar 40 adapted to bear against the boss 37, and also with a spring 41 surrounding the screw bolt and extending between the collar 40 and the inner face of the boss 35. Exteriorly of the boss 35 the screw bolt 39 is provided with an adjusting nut 42. The bosses 36 and 38 are on the opposite side of the central line of the housing and are similarly fitted with a screw bolt 43 having an adjusting nut 44, a collar 45, and a spring 46 surrounding the bolt 43 and extending between the collar 45 and the inner face of the boss 36. These parts are clearly illustrated in Figures 1, 2, and 9.

The top plate 21 of the pedestal in spaced positions is provided with segments 47 and the underside of the base 23 with similarly placed bosses 48 to which latter cleats 49 are secured by bolts 50 or otherwise so as to prevent any appreciable upward movement of the housing relatively to the pedestal and the top plate thereof.

Figure 3:
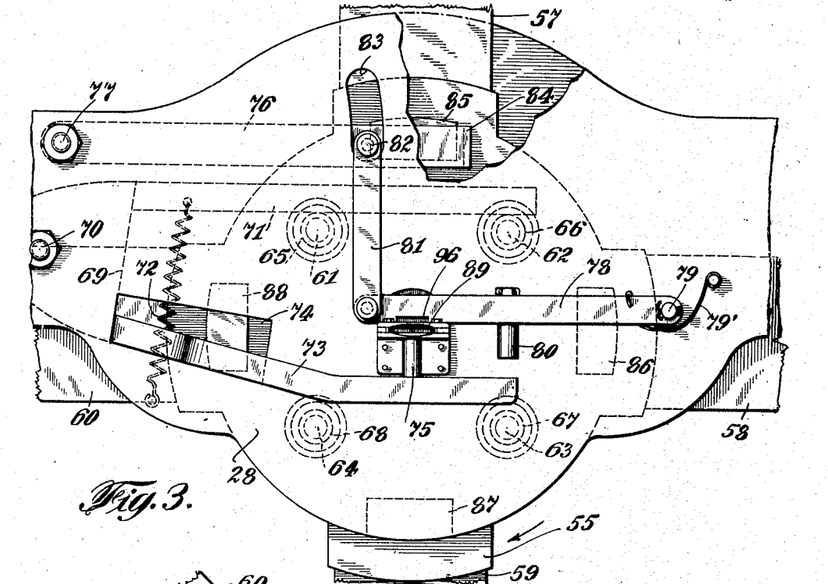
Fig. 3 is a plan of the operating parts of the turnstile showing the same in their normal position of rest, taken on line 3—3, Fig. 2.
Figure 4:
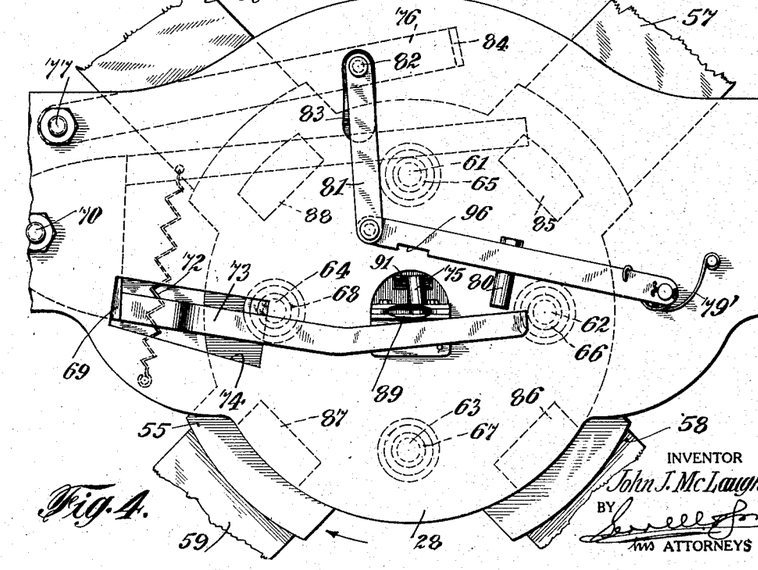
Fig. 4 is a similar view showing the parts in another position.

Fitted to turn on the tubular member 30 is a sleeve 51. The lower end of this sleeve rests upon a bearing plate 52 which is associated with a bearing plate 53 and intermediate ball bearings 54 or otherwise in order to reduce the friction of the revoluble parts as will be readily understood. Suitably connected to the sleeve 51 there are spaced plates 55 and 56 secured between which in any suitable manner are the turnstile arms 57, 58, 59 and 60. As illustrated, I have shown four equally spaced arms as this is the number which is customarily employed in turnstiles of the type to which my invention relates, although it will be understood that any number of these arms may be thus employed. On the upper surface of the plate 55 there are spaced pins 61, 62, 63 and 64 provided respectively with rollers 65, 66, 67 and 68. In the housing an oscillating head 69 is pivotally mounted as indicated at 70. Connected to and extending from this oscillating head 69 there is a lever arm 71 which I prefer to call a positioning lever. The oscillating head is normally maintained in position with the positioning lever 71 in contact with a set of rollers, such for example as the rollers 65 and 66 as shown in Fig. 3, by means of a spring 72 or otherwise. Also connected to and moving with the oscillating head 69 there is a lever 73 which extends upwardly through an aperture 74 provided for this purpose in the upper plate 28 and is fitted with a pin 75. As hereinafter described, I prefer to refer to this lever 73 as the token or coin lever.

The parts of the turnstile are normally locked against a turning movement in one direction while the same are free to turn in the opposite direction, the locking devices being actuated through the intervention of a predetermined coin or token so as to free the same when such a token is inserted in the apparatus. These devices comprise a locking lever 76 pivotally mounted at 77 in the housing and adapted to extend over an upper edge portion of the plate 55. These devices also include a release lever 78 pivotally mounted at 79 in the housing and normally maintained in an initial position by a spring 79' or otherwise. The release lever 78 is fitted with a pin 80 and is connected by a link 81 with a bolt 82 passing through and operating in a slot 83 provided therefor in the upper plate 28 and connected to the locking lever 76. At its free end the locking lever 76 is provided with a hook or projection 84 and in spaced positions in the upper peripheral portion of the plate 55 there are lugs 85, 86, 87 and 88 so placed as to engage the hook 84 at the end of the locking lever 76 unless the same has been swung to permit the adjacent lug to clear the hook.

Figure 7:
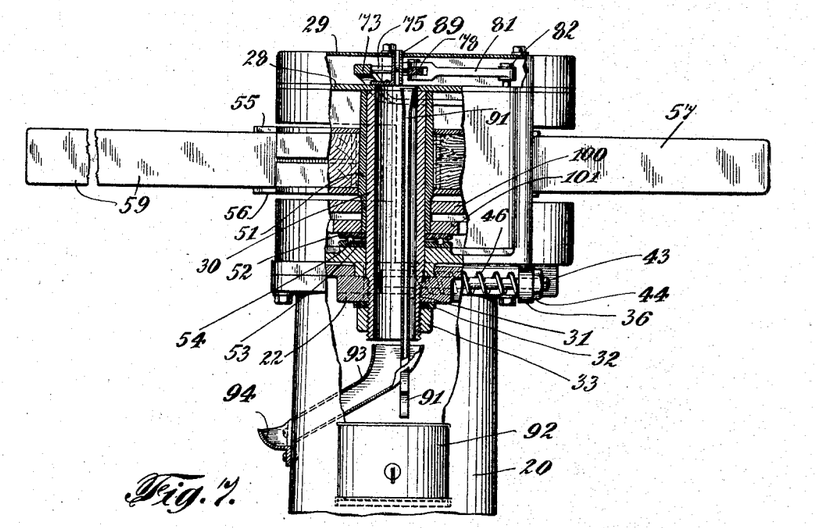
Fig. 7 is a sectional elevation taken on line 7—7, Fig. 2.
Figure 8:
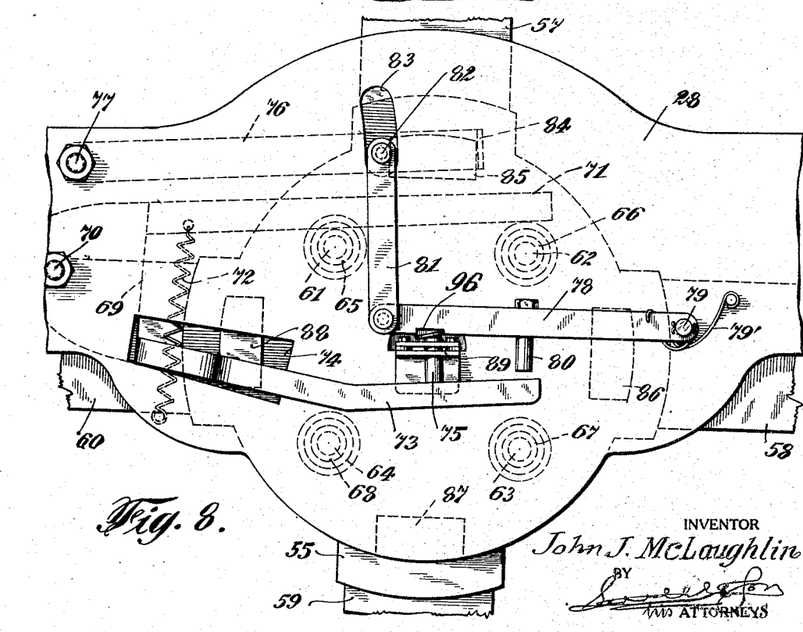
Fig. 8 is a plan similar to Fig. 3, illustrating the effect of using a token other than that intended to operate the apparatus.
Figure 10:
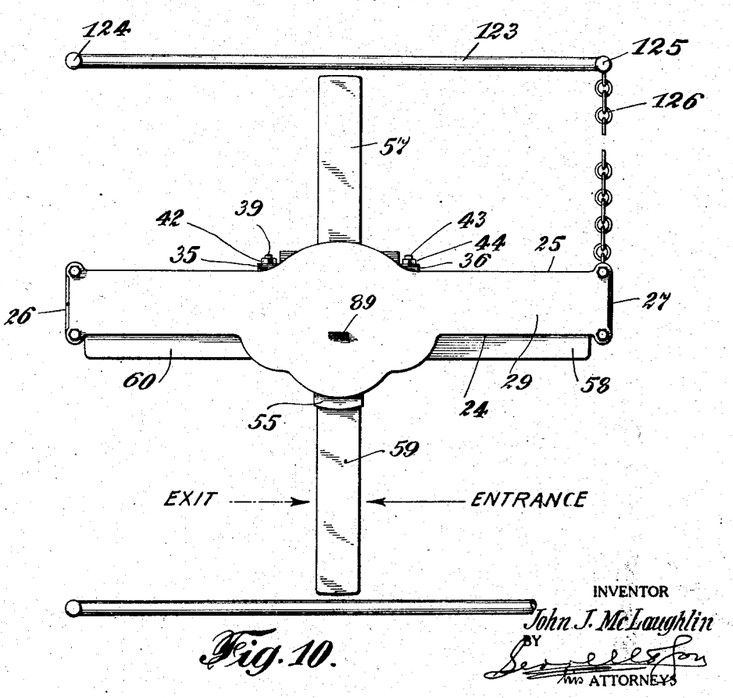
Fig. 10 is a plan illustrating the operation of the apparatus.
Figure 14:
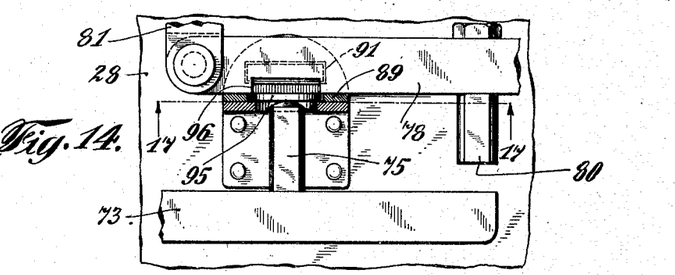
Fig. 14 is a sectional plan illustrating the coin operated devices showing the same in one position.
Figure 15:
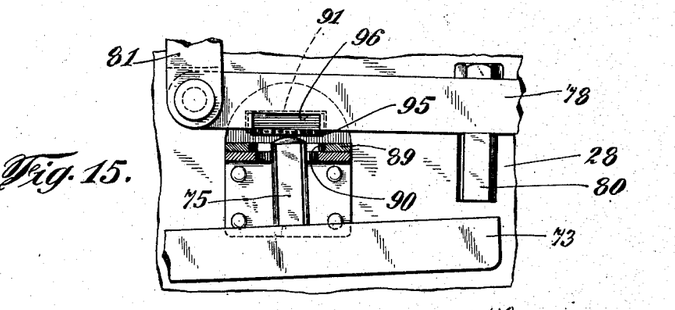
Fig. 15 is a similar view showing these parts in another position.
Figure 16:
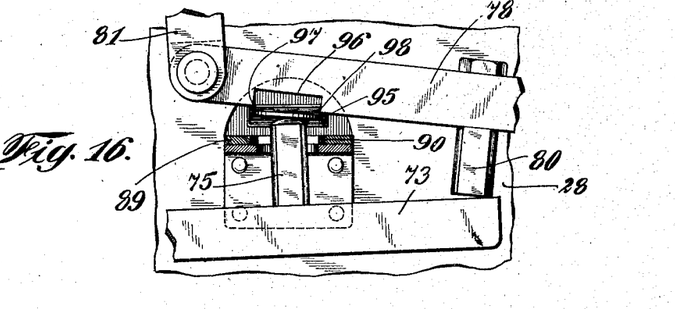
Fig. 16 is also a similar view in a position in which the coin or token is released.
Figure 17:
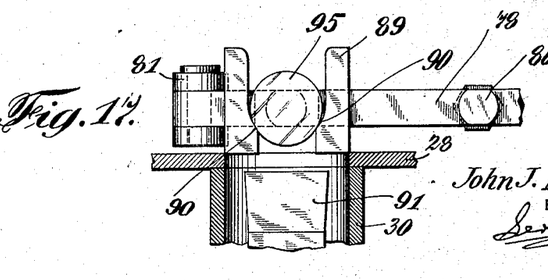
Fig. 17 is a sectional elevation illustrating the stop for the coin after the same has been inserted and before being engaged by the operating mechanism.

Suitably attached to the upper plate 28 or otherwise and extending through the cover 29 there is a coin slot member 89. This in a suitable place is provided with shoulders 90 forming stops for a coin or token so as to arrest the same in a position lying between the pin 75 and a portion of the release lever 78 as hereinafter described. Extending through the tubular member 30 there is a coin chute 91 which leads to a suitable receptacle 92. At the lower end of the tubular member 30 there is an auxiliary coin chute 93 which leads to an opening in the pedestal and to a cup or other receptacle 94, placed exteriorly thereof as is particularly illustrated in Fig. 7 of the drawing. In the introduction of a coin of predetermined denomination or a token as indicated at 95 in the coin slot member 89, the coin drops upon and is arrested by the shoulders or stops 90. In this position the coin lies adjacent the end of the pin 75 and also in a position juxtaposed to a notch 96 in the edge portion of the release lever 78 so that the coin extends appreciably beyond the ends 97 and 98 defining the extent of this notch 96, as is clearly indicated in Fig. 14 of the drawing. Assuming the coin is that intended to operate the apparatus and that the entrance direction is from right to left as indicated in Fig. 10, the operation of the arms will be in a clockwise direction. In this operation the initial turning movement of the arms causes an initial turning movement of the plates 55 and 56 causing the roller 65 to swing the positioning lever 71 and to impart a corresponding movement to the coin lever 73. This movement immediately causes the pin 75 to contact with the coin and to force the same against the edge of the release lever 78. The continued initial movement of these parts swings the release lever and imparts a corresponding movement to the locking lever 76 through the link 81 and the bolt 82. Before the arms have turned sufficiently far to cause the lug 85 to contact with the hook projection 84 at the extremity of the locking lever 76, this lever has been swung sufficiently far to clear the lug, permitting the continued movement of the arm so as to allow the patron to pass through. As the arms continue to turn the free end of the token lever engages the pin 80 and the relationship of the parts is such that the swinging movement of the release lever through this contact is greater than the swinging movement of the pin 75 so that the release lever moves free from the coin. This occurs as the coin is immediately over the upper end of the coin chute 91 so that as the coin is released it falls into the chute and finds its way by the action of gravity to the receptacle 92. In the event of a coin or token of smaller diameter than that of the predetermined denomination intended to operate the apparatus is used in an effort to operate the machine as shown in Fig. 8, the coin may wedge in the notch and if it does will prevent the operation of the apparatus because then the release lever 78 and the parts associated therewith will not be moved sufficiently far to release the hook 84 from the adjacent lug. Obviously also, if the token is of sufficiently smaller diameter than the coin intended to operate the apparatus, it will fall through the coin slot member and the tubular member to the chute 93 and be returned to the cup 94 arranged exteriorly of the pedestal. It will also be understood that in the turning of the arms in the opposite or counter clockwise direction the roller 66 swings the levers 71 and 73 sufficiently far to move the locking lever 76 to a position in which the hook end thereof will clear the next following lug 86 so that the apparatus is free to turn in this direction.

Figure 2:
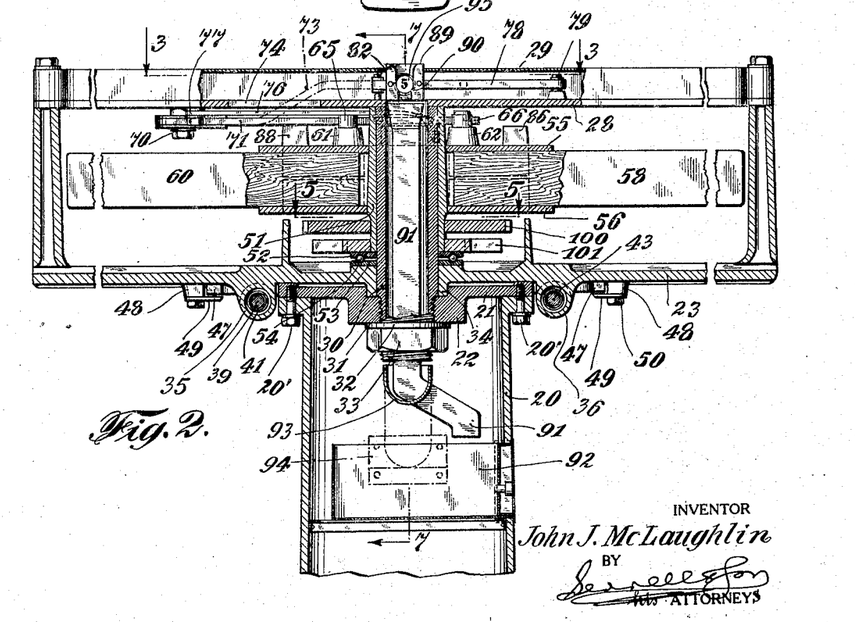
Fig. 2 is a sectional elevation on line 2—2, Fig. 1.
Figure 5:
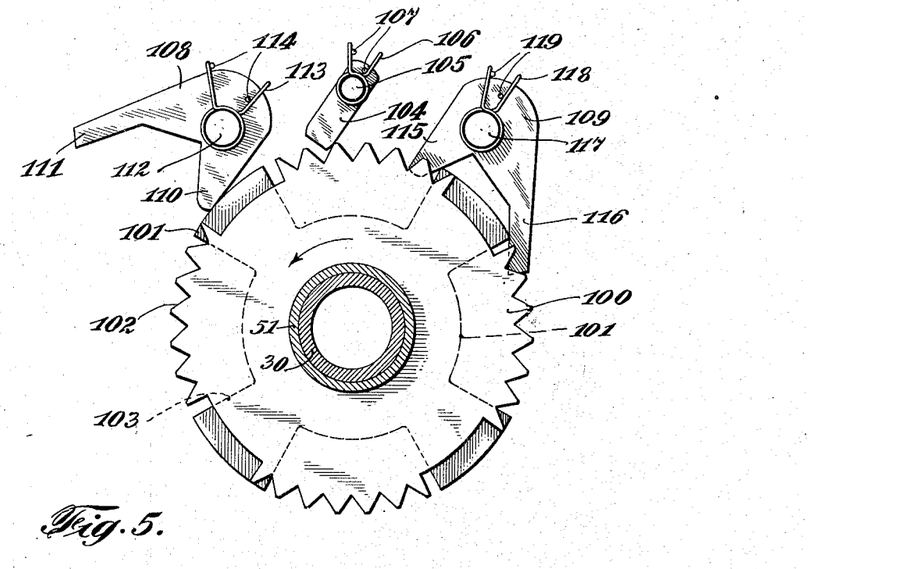
Fig. 5 is a sectional plan of the devices for making it necessary to complete a partial turn of the turnstile arms and the revoluble head in which they are mounted, and also for bringing these parts to a positive stop with each predetermined partial revolution thereof, the same being taken on line 5—5, Fig. 2.
Figure 6:
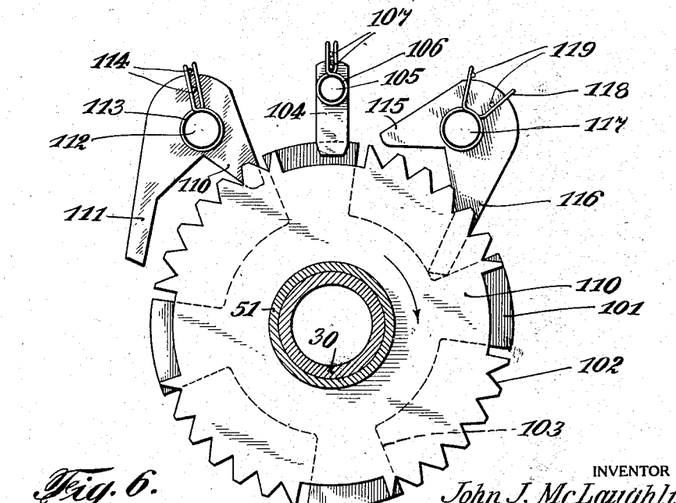
Fig. 6 is a similar veiw showing these parts in another position.

The turnstile is also fitted with means for making it necessary to complete a predetermined portion of a revolution of the arms and also to bring the same to a positive stop with each intended partial revolution thereof. The mechanism for accomplishing these purposes is illustrated in Figures 2, 5 and 6 of the drawing. These devices consist in a mutilated gear disk 100 and a notched disk 101. The teeth in the mutilated disk are indicated at 102 and the notches in the notched disk provide for spaced projections 103 therein. A pawl 104 is pivotally mounted at 105 and normally maintained in an initial position by a spring 106 cooperating with stop pins 107. This pawl engages the teeth 102 of the mutilated gear disk so that as will be understood, irrespective of the direction in which the turnstile arms are operated after the arms have been turned sufficiently far to cause the pawl to engage the teeth, the arms cannot turn back until a predetermined portion of a revolution, which in this instance is a quarter turn, is made. I also employ dogs 108 and 109 cooperating with the notched disk 101. The dog 108 is formed to include a nose 110 and a heel 111 and is pivotally mounted as indicated at 112. This dog is normally maintained in an initial position by a spring 113 cooperating with stop pins 114. Similarly the dog 109 is so formed as to be provided with a nose 115 and a heel 116. This dog is pivotally mounted as indicated at 117 and is normally maintained in an initial position by the action of a spring 118 cooperating with stop pins 119. In the operation of this device assuming the arms are turned in clockwise position as shown in Fig. 6, the heel 116 of the dog 109 momentarily enters the adjacent notch in the notched disk and abuts against the adjacent projection and thus determines the extent of that particular turning movement of the arms of the turnstile. When the parts assume their normal positions the spring swings the dog to place so that the heel clears the projection and the arms are free to be actuated again. The other dog 108 is similarly employed for insuring a positive stop of the turnstile arms when turned in the opposite direction. As it will be understood this device also prevents the turnstile from being moved in more than a predetermined portion of a revolution at one operation thereof.

Figure 11:
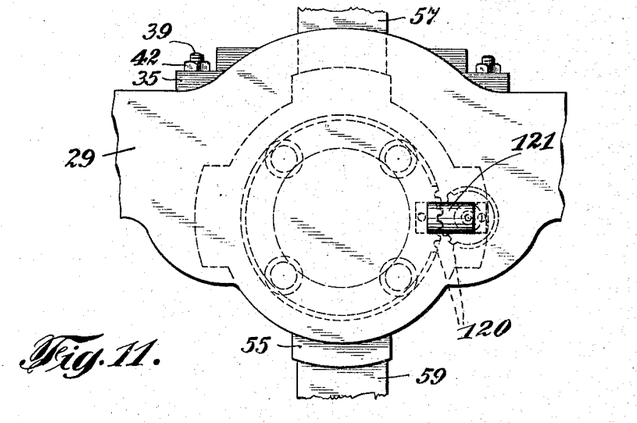
Fig. 11 is a plan illustrating the use of a register or recording apparatus as employed with the turnstile.
Figure 12:
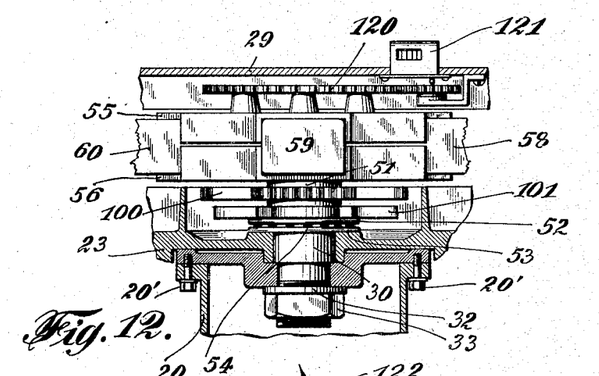
Fig. 12 is a sectional elevation of the same.

As shown in Figs. 11 and 12 the apparatus may be provided with a suitable train of gears 120 for operating the register or recording device 121 to automatically record the number of passengers or patrons utilizing the turnstile. Also as indicated in Fig.

Figure 13:
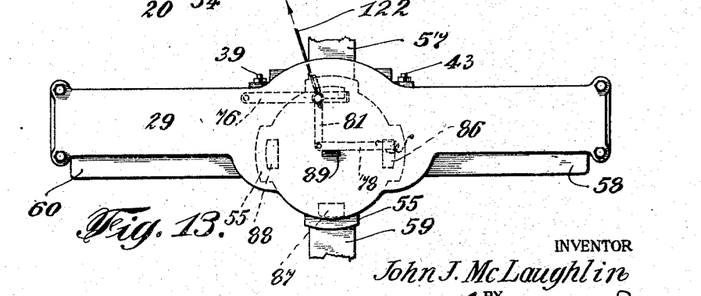
Fig. 13 is a plan illustrating an attachment whereby the operator may free the turnstile for use.

13, the locking lever and the parts associated therewith may be actuated by a chain or rope 122 controlled by the agent or attendant so as to release the lock, making the turnstile operative at his pleasure.

It will furthermore be understood that the frame of the turnstile may be suitably enclosed so that at one side thereof the arms pass through the said enclosure making a one-way passage on the operative side of the turnstile, or as indicated in Fig. 10, the turnstile may be located centrally in a passage and the outside rail 123 which is mounted on posts 124 and 125 or otherwise may be utilized together with a chain 126 or other similar device to close this outer portion of the passage way. The particular manner in which the turnstile is placed forms no part of my present invention.

I claim as my invention:

1. In a turnstile, a plurality of spaced revoluble arms, a locking lever for normally preventing the said arms from being turned in one direction but permitting the said arms to be turned in the other direction, a positioning lever for normally maintaining the said arms in a predetermined position, and devices actuated by the positioning lever upon the initial movement of the said arms in one direction and through the intervention of a token for moving the said locking lever to free the said arms thereby permitting the said arms to be turned a predetermined portion of a revolution in one direction.

2. In a turnstile, a revoluble frame, a plurality of arms carried by said frame, a locking lever coacting with the said frame to normally prevent the same and the arms from being turned in one direction and permitting the frame and arms to be turned in the other direction, a positioning lever cooperating with the said frame to normally determine the position of the same and the arms carried thereby, and devices actuated by the positioning lever upon the initial movement of the frame and arms in one direction and through the intervention of a token for moving the said locking lever to free the said frame permitting the same and the arms carried thereby to be turned a predetermined portion of a revolution in one direction.

3. In a turnstile, a plurality of spaced revoluble arms, a locking lever for normally preventing the said arms from being turned in one direction but permitting the arms to be turned in the other direction, a positioning lever for normally maintaining the arms in a predetermined position, and means whereby in the initial movement of the positioning lever and the engagement with a token an initial movement is imparted to the locking lever and in the continued movement of the positioning lever the token is released and the movement of the locking lever completed to free the said arms permitting the same to be turned a predetermined portion of a revolution.

4. In a turnstile, a pedestal, a revoluble frame, spaced arms carried by the said frame, a locking lever, a plurality of lugs on the said frame each adapted to coact with the said locking lever to normally prevent the said frame and arms from being turned in one direction and permitting the said frame and arms to be moved in the other direction, a plurality of positioning devices carried by the said frame, a positioning lever cooperating with the said positioning devices to normally determine the position of the said revoluble frame and arms, and devices wholly mechanical actuated by the said positioning lever upon the initial movement of the said revoluble frame and arms in one direction and through the intervention of a token for moving the said locking lever free of the adjacent lug on the frame thereby permitting the said revoluble frame and arms to be turned a predetermined portion of a revolution in the said one direction.

5. In a turnstile, a pedestal, a revoluble frame mounted in the pedestal, a plurality of spaced arms carried by the said revoluble frame, a plurality of lugs on the said revoluble frame, a locking lever cooperating successively with the said lugs to prevent the said revoluble frame and arms from turning in one direction, a release lever connected to the said locking lever, a positioning lever, a plurality of positioning devices carried by the said revoluble frame and cooperating with the said positioning lever for determining the normal initial position of the said revoluble frame and arms, and devices wholly mechanical actuated through the operation of the said positioning lever and positioning devices upon the initial movement of the said revoluble frame and arms in one direction and through the intervention of a token for actuating the said release lever and locking lever to free the latter from the adjacent lug thereby permitting the said revoluble frame and arms to be turned a predetermined portion of a revolution in said one direction.

6. In a turnstile, a pedestal, a revoluble frame mounted in the pedestal, a plurality of spaced arms carried by the said revoluble frame, a plurality of lugs on the said revoluble frame, a locking lever cooperating successively with the said lugs to prevent the said revoluble frame and arms from turning in one direction, a release lever connected to the said locking lever, a positioning lever, a plurality of positioning devices carried by the said revoluble frame and cooperating with the said positioning lever for determining the normal initial position of the said revoluble frame and arms, and a lever arm actuated by the said positioning lever and positioning devices upon the initial turning movement of the said revoluble frame and arms in one direction for engaging a token and moving the same against the said release lever to thereby operate the release lever and the locking lever to move the latter free from the adjacent lug thereby permitting the said revoluble frame and arms to be turned a predetermined portion of a revolution in the said one direction.

7. In a turnstile, a pedestal, a revoluble frame mounted in the pedestal, a plurality of spaced arms carried by the said revoluble frame, a plurality of lugs on the said revoluble frame, a locking lever cooperating successively with the said lugs to prevent the said revoluble frame and arms from turning in one direction, a release lever connected to the said locking lever, a positioning lever, a plurality of positioning devices carried by the said revoluble frame and cooperating with the said positioning lever for determining the normal initial position of the said revoluble frame and arms, a lever arm actuated by the said positioning lever, and a pin carried by the said lever arm adapted, when the said lever arm is moved, to bear against a token and through the intervention of the token to operate the release lever and the locking lever to move the latter free from the adjacent lug thereby permitting the said revoluble frame and arms to be moved a predetermined portion of a revolution in the said one direction.

8. In a turnstile, a pedestal, a revoluble frame mounted in the pedestal, a plurality of spaced arms carried by the said revoluble frame, a plurality of lugs on the said revoluble frame, a locking lever cooperating successively with the said lugs to prevent the said revoluble frame and arms from turning in one direction, a release lever connected to the said locking lever, a positioning lever, a plurality of positioning devices carried by the said revoluble frame and cooperating with the said positioning lever for determining the normal initial position of the said revoluble frame and arms, a lever arm, a pin carried thereby and adapted to contact with a token, and a post carried by the said release lever and adapted to be engaged by the extremity of the said lever arm whereby in the initial movement of the revoluble frame and arms in one direction the positioning lever and devices actuate the said lever arm to force the pin against the token and the token against the release lever to operate the release lever and the locking lever freeing the latter from the adjacent lug thereby freeing the said revoluble frame and arms and by the continued movement of the lever arm after the same is moved into contact with the said post causing the release lever to move faster than the lever arm thereby freeing the said token.

9. In a turnstile, a pedestal, a revoluble frame mounted in the pedestal, a plurality of spaced arms carried by the said revoluble frame, a plurality of lugs on the said revoluble frame, a locking lever cooperating successively with the said lugs to prevent the said revoluble frame and arms from turning in one direction, a release lever connected to the said locking lever, a positioning lever, a plurality of positioning devices carried by the said revoluble frame and cooperating with the said positioning lever for determining the normal initial position of the said revoluble frame and arms, a lever arm, a pin carried thereby and adapted to contact with a token, and a post carried by the said release lever and adapted to be engaged by the extremity of the said lever arm whereby in the initial movement of the revoluble frame and arms in one direction the positioning lever and devices actuate the said lever arm to force the pin against the token and the token against the release lever to operate the release lever and the locking lever freeing the latter from the adjacent lug thereby freeing the said revoluble frame and arms and by the continued movement of the lever arm after the same is moved into contact with the said post causing the release lever to move faster than the lever arm thereby freeing the said token, said positioning lever and positioning devices operating through the said lever arm, post, and release lever, to swing the locking lever free from the next succeeding lug when the said revoluble frame and arms are moved in the opposite direction, thereby permitting the revoluble frame and arms to be always movable in the said opposite direction.

Signed by me this 10th day of October, 1925.

JOHN J. McLAUGHLIN.